United States Patent [19]
Sakaguchi

[11] Patent Number: 5,748,779
[45] Date of Patent: May 5, 1998

[54] METHOD AND APPARATUS FOR INPUTTING HANDWRITTEN ALPHANUMERIC CHARACTERS AND FOR DISPLAYING THE INPUT CHARACTERS

[75] Inventor: Katsuhiko Sakaguchi, Kawasaki, Japan

[73] Assignee: Canon Kabushiki Kaisha, Tokyo, Japan

[21] Appl. No.: 874,545

[22] Filed: Jun. 13, 1997

Related U.S. Application Data

[63] Continuation of Ser. No. 450,101, May 25, 1995, abandoned, which is a continuation of Ser. No. 93,952, Jul. 21, 1993, abandoned.

[30] Foreign Application Priority Data

Jul. 31, 1992 [JP] Japan .................................. 4-205105

[51] Int. Cl.$^6$ ...................................................... G06K 9/46
[52] U.S. Cl. ............................ 382/203; 382/201; 395/141
[58] Field of Search ......................................... 382/188, 189, 382/201, 203, 286; 345/146; 395/109, 140–143

[56] References Cited

U.S. PATENT DOCUMENTS

| | | |
|---|---|---|
| 4,653,107 | 3/1987 | Suojima ................................... 382/13 |
| 4,672,677 | 6/1987 | Yamakawa .............................. 382/13 |
| 4,727,588 | 2/1988 | Fox et al. ................................ 382/13 |
| 5,107,541 | 4/1992 | Hilton ...................................... 382/3 |
| 5,121,442 | 6/1992 | Togawa et al. ......................... 382/13 |
| 5,125,039 | 6/1992 | Hawkins ................................. 382/30 |
| 5,150,424 | 9/1992 | Aguro et al. ........................... 382/13 |
| 5,250,929 | 10/1993 | Hoffman et al. ...................... 345/146 |

FOREIGN PATENT DOCUMENTS

| | | |
|---|---|---|
| 0146947 | 7/1985 | European Pat. Off. . |
| 0295699 | 12/1988 | European Pat. Off. . |

*Primary Examiner*—Yon Couso
*Attorney, Agent, or Firm*—Fitzpatrick, Cella Harper & Scinto

[57] ABSTRACT

In a figure input method and apparatus, coordinate points are input, a locus made by a plurality of input coordinate points is stored, and the stored locus is displayed. Thereafter, the kind of figure corresponding to the input locus is assigned, and a correct figure corresponding to the locus is drawn based on the assigned kind of figure and stored locus information.

25 Claims, 6 Drawing Sheets

METHOD AND APPARATUS FOR INPUTTING HANDWRITTEN ALPHANUMERIC CHARACTERS AND FOR DISPLAYING THE INPUT CHARACTERS

This application is a continuation of application Ser. No. 08/450,101 filed May 25, 1995, now abandoned, and Ser. No. 08/093,952 filed Jul. 21, 1993, now abandoned.

BACKGROUND OF THE INVENTION

1. Field of the Invention

This invention relates to a figure input method and apparatus in which a correct pattern of a hand-written pattern, such as a figure or the like, whose coordinates have been input, can be obtained.

2. Description of the Related Art

In a conventional apparatus in which a figure is input using coordinate input means, such as a tablet or the like, the pattern of the figure is input after selecting the kind of input figure (for example, a circle, a straight line, a polygon or the like) using a menu picture frame or the like. Thus, the form and the size of a correct figure is determined from the kind of figure selected on the menu picture frame, and coordinate data of the hand-written pattern.

In the above-described conventional-approach, however, before drawing a figure, the user must select the kind of figure using a menu or the like, thereby complicating the procedure. However, when copying a previously drawn figure, the user must perform an input operation in consideration of the entire figure and the arrangement of the figure. Such an operation will cause, for example, interruption in thinking, and inferior operational efficiency. Moreover, the user must, for example, previously sketch a figure to be input on another sheet of paper.

In another conventional approach, the kind of figure input by handwriting is determined by comparing the pattern of the figure with a standard figure pattern stored in a memory, and a correct figure is obtained by providing a figure corresponding to the determined kind of figure.

In this approach, it is unnecessary to input a kind of figure when inputting the pattern of the figure, thereby causing an increase in operability. However, since the kind of figure is determined by comparing the pattern of the figure with a standard pattern stored in the memory, the user must exactly input the figure by handwriting. If the figure is input by handwriting in a rough manner, the kind of the figure cannot be determined as desired. Hence, the processing of inputting the figure pattern must be repeated until a desired figure is determined.

SUMMARY OF THE INVENTION

The present invention has been made in consideration of the above-described problems.

It is an object of the present invention to provide a figure input apparatus in which a correct figure can be obtained from the locus of a figure input by free handwriting, without complicated user-procedures.

According to the present invention, a locus input through coordinate input means is displayed on display means and stored in storage means. Upon instruction of forming a correct figure, the corresponding correct figure is drawn on the display means based on the stored input locus. Thus, when the user inputs a figure as a locus, he need not select, for example, the kind of the figure. The user can sequentially input arbitrary figures, and obtain a correct figure corresponding to the drawn hand-written figure at an arbitrary time.

It is another object of the present invention to provide a figure input apparatus and method having excellent operability in which desired locus information is selected from among a plurality of displayed locus information and a correct figure corresponding to the selected locus information is drawn. Thus, it is possible to instruct the formation of correct figures together after first inputting the loci of figures, and to separate an input operation of the loci from instruction of the formation of correct figures.

It is still another object of the present invention to provide a figure input apparatus and method in which information relating to the kinds of assigned figures is stored, and a correct figure is drawn using the stored information and locus information selected at that time. Hence, instructing the formation of a correct figure of the same kind can be performed without interruption, thereby simplifying the operation.

These and other objects, advantages and features of the present invention will become more apparent from the following desciption of the preferred embodiments taken in conjunction with the accompanying drawings.

DESCRIPTION OF THE PREFERRED EMBODIMENTS

A preferred embodiment of the present invention will now be described in detail with reference to the drawings.

Figure 6:
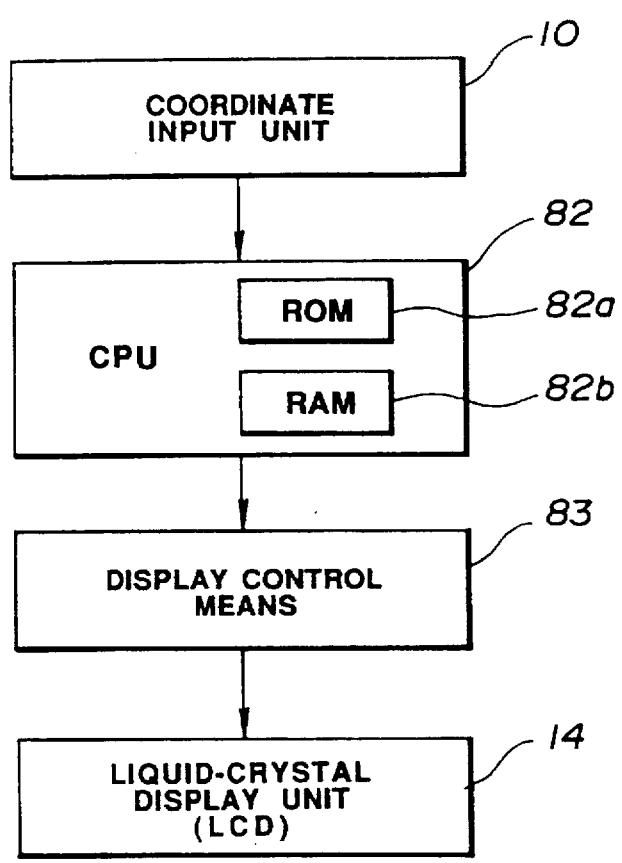
FIG. 6 is a block diagram illustrating the configuration of the apparatus of the first embodiment.

First, the configuration of the entire apparatus of the present embodiment will be described with reference to FIG. 6. In FIG. 6, coordinate input unit 10 is a conventional input plate in which a plurality of electrodes are provided in the vertical and horizontal directions. By pressing an input pen, such as a stylus pen or the like, onto coordinate input unit 10, coordinate data are input. The coordinate data are transmitted to a central processing unit (hereinafter abbreviated as a CPU) 82. ROM 82a stores control programs for performing, for example, the processing of the flowcharts shown in FIGS. 3 and 4, and a character-pattern dictionary. RAM 82b stores various kinds of data. CPU 82 executes the processing shown in the following flowcharts in accordance with the control programs stored in ROM 82a. The coordinate value of a pattern input from coordinate input unit 10 is stored in RAM 82b, and is compared with the character-pattern dictionary stored in ROM 82a. The result of that recognition is output. The pattern input through coordinate input unit 10, the result of the recognition, and display data, such as a menu window or the like, are displayed on liquid-crystal display (LCD) unit 14 under the control of display control means 83.

Figure 1:
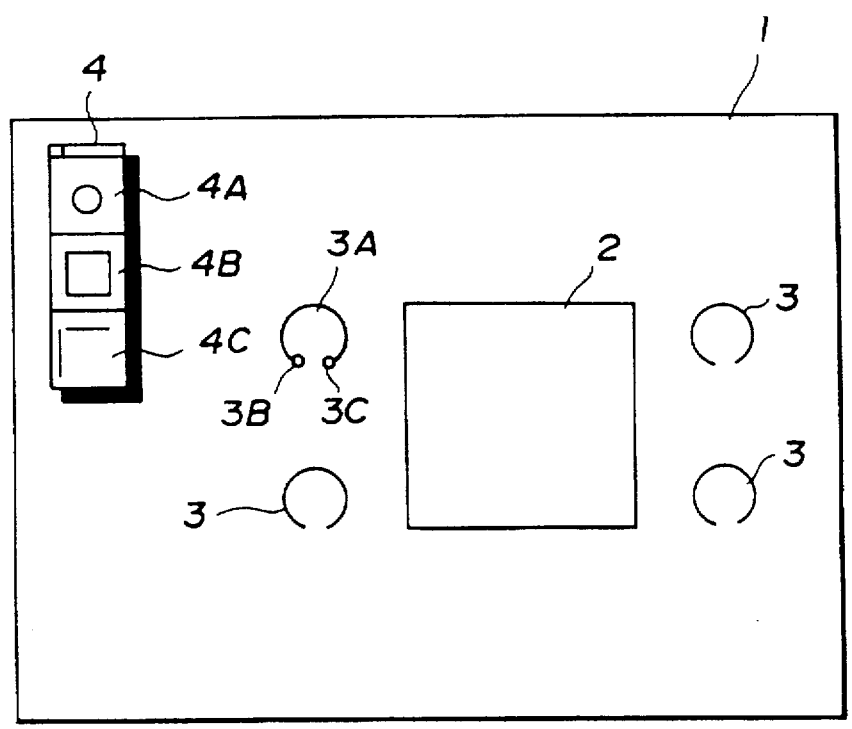
FIG. 1 is a diagram illustrating a figure drawn according to the present invention and a menu display on a display picture frame.

FIG. 1 is a diagram which most exactly illustrates the characteristics of a figure input operation on display unit 14 according to the present invention. In FIG. 1, reference numeral 1 represents a display picture frame of the figure input apparatus. Reference numeral 2 represents a free locus input on display picture frame 1 via a tablet (coordinate input unit 10) superposed on display unit 14. In this case, free locus 2 has been drawn by the user for inputting a quadrangle. The user has selected locus 3A from among loci 3 indicating four circles displayed on display picture frame 1 in order to input a circle. Locus 3 is indicated as a thick locus on display picture frame 1 so that the selected figure can be discriminated from other figures. The start point and the end point of locus 3A are also indicated while adding a start-point mark and an end-point mark to locus information. Correct-figure menu 4 is displayed on picture frame 1. The kinds of figures are illustrated in correct-figure menu 4 in order to input information relating to the kind of figure. In the present embodiment, three kinds of figures, i.e., a circle 4A, a quadrangle 4B and a vertical or horizontal straight line 4C, are displayed so that a figure can be selected by pressing an input pen or the like onto each figure icon. In the present embodiment, one figure pattern 3A is selected from among the drawn quadrangular locus 2 and the circular loci 3, and a correct figure is obtained in accordance with the kind of the figure assigned from menu 4 and the size of the figure pattern. Display menu 4 is displayed when selecting a locus.

Figure 2:
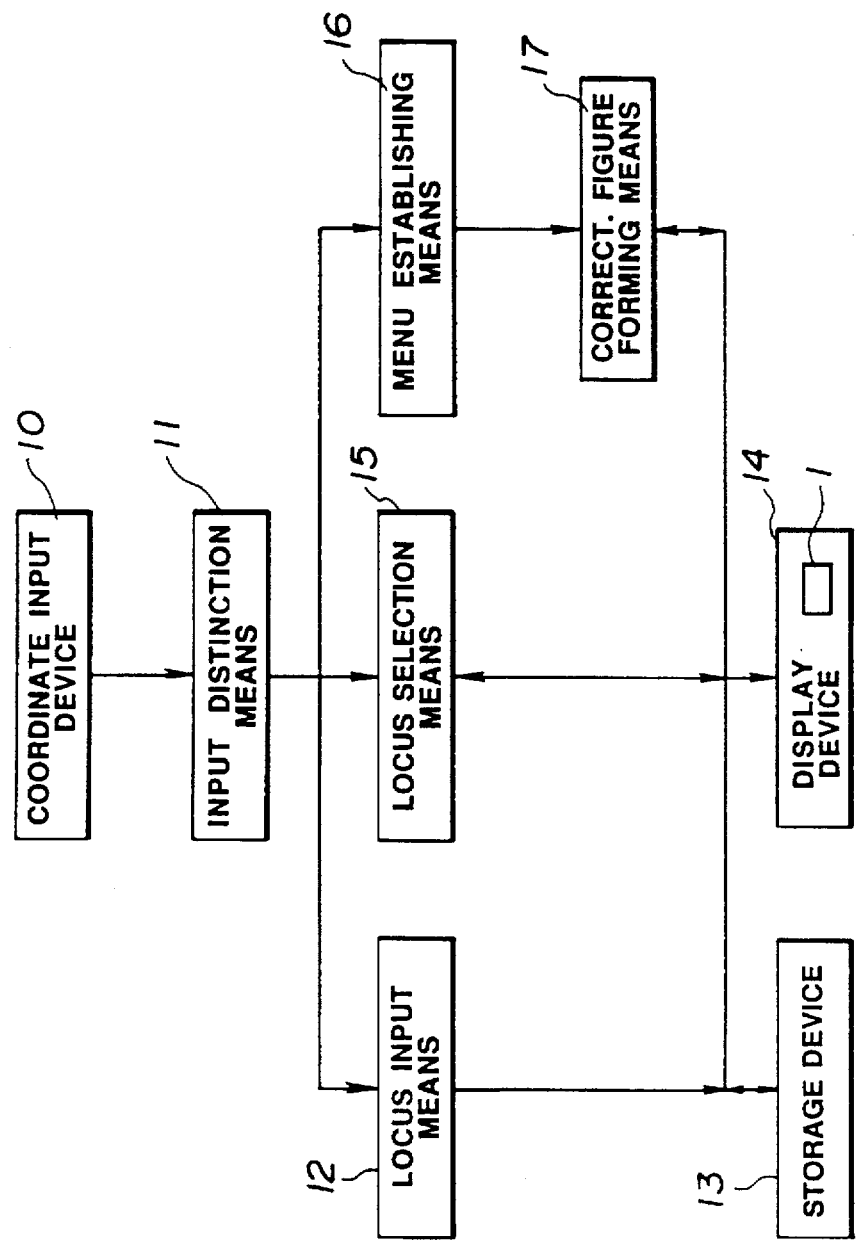
FIG. 2 is a block diagram illustrating the configuration of a first embodiment of the present invention.

FIG. 2 illustrates the functional configuration of the circuitry of the embodiment. In FIG. 2, reference numeral 10 represents a coordinate input device in which coordinates can be assigned by pressing a device, such as a stylus pen or the like, onto the tablet, and which is often used as an input apparatus for CAD or a personal computer. Input distinction means 11 determines whether the assigned coordinates input via the tablet of input device 10 have been input merely as a locus, represent a locus to be selected from among drawn loci, or represent a figure to be selected from display menu 4. Locus input means 12 stores input-coordinate string from the tablet, which has been determined as an input of a locus by input distinction means 11, in storage device 13 as a hand-written locus of a figure, and displays a locus line obtained by connecting respective coordinate points on display device 14, as represented by reference numeral 2 shown in FIG. 1. Locus selection means 15 assigns the input coordinates from the tablet, which have been determined by input distinction means 11 to have been input for selecting a locus, as a selected locus, and determines whether the point corresponding to the input coordinates is on the drawn locus based on information stored in storage device 13. The selected locus is thickened, the start point and the end point of the locus are clearly displayed on display device 14 by adding start-point mark 3B and end-point mark 3C thereto, and information relating to the selected figure pattern is transmitted to correct figure forming means 17 (see FIG. 1). Menu establishing means 16 determines which of the circle, the quadrangle, and the straight line, the figure is assigned based on the input coordinates from the tablet determined to have been input for selecting a menu by input distinction means 11, by determining to which icon region on menu picture frame 4 the coordinates are present. Information relating to the kind of figure assigned on menu picture frame 4 is stored in RAM 82b until a kind of another figure is newly assigned. Correct figure forming means 17 reads information relating to the locus of the figure pattern selected and assigned by locus selection means 15 from storage device 13, and forms a correct figure corresponding to the input figure in the form of any of the circles, the quadrangle, and the straight line in accordance with the determination by menu establishing means 16 and the locus information. Thus, the correct figure is displayed on display device 14 in the shape selected by menu establishing means 16. When the correct figure has been displayed, the original figure pattern (the selected figure pattern) may be erased from the display.

Figure 3:
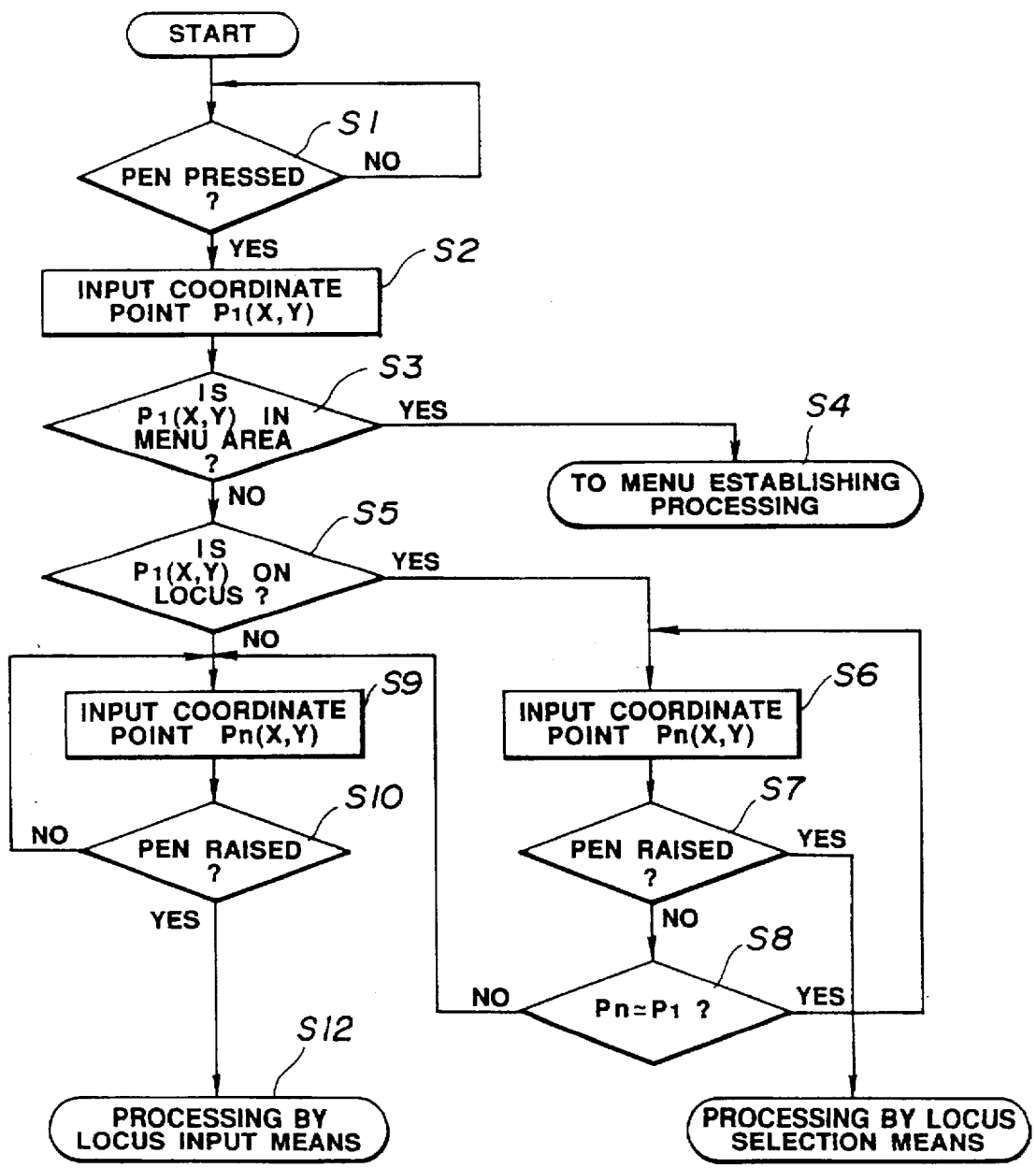
FIG. 3 is a flowchart illustrating the procedure of the operation of the input distinction means shown in FIG. 2.

Next, a description will be provided for the operation of input distinction means 11 of the present embodiment with reference to the flowchart of FIG. 3.

First, in step S1, it is determined whether or not the pen has been pressed onto the tablet. If the result of the determination is affirmative, the process proceeds to step S2. In step S2, the coordinates $P_1(X, Y)$ of the input point are read from coordinate input device 10 and are stored in RAM 82b. The process then proceeds to step S3, in which it is determined whether or not the coordinates $P_1$ are present within the coordinates $M(X_{min}, Y_{min})$–$M(X_{max}, Y_{max})$ of the menu area by querying display control means 83 about the status of the displayed menu and comparing the display area of the displayed menu with the value of the coordinates $P_1$. If the result of the determination is affirmative, the process branches to step S4, in which menu establishing processing is performed. If the result of the determination in step S3 is negative, the process proceeds to step S5, in which it is determined whether or not the coordinates $P_1$ are present on the drawn locus. Such a determination can be easily performed by checking the value of the coordinates $P_1$ while comparing it with the coordinate value of the locus stored in storage device 13. The determination may be facilitated by loosening accuracy in the assignment of locus selection by providing a certain tolerance in the coordinate value of the locus. If the result of the determination in step S5 is affirmative, the process proceeds to step S6. If the result of the determination in step S5 is negative, the process proceeds to step S9. In step S9, the coordinates $P_n$ of the next point assigned by the input pen are read from coordinate input device 10. In the next step S10, the coordinates $P_n$ are checked. If the coordinates $P_n$ do not have effective values both in the X and Y coordinates, it is determined that the pen has been raised, and postprocessing by locus input means 12 is performed. If the result of the determination in step S10 is negative, the process returns to step S9, and the same processing is repeated. In steps S6 and S7, the same processing as in steps S9 and S10 is performed. When the pen has been raised in step S7, it is determined that a locus has been selected, and the process proceeds to processing by locus selection means 15 in step S12. When the pen has not been raised, the process proceeds to step S8. In step S8, it is determined whether or not the coordinates $P_n$ of the newly input point are substantially the same as the coordinates $P_1$ of the start point based on the value $|P_n-P_1|$. If the result of the determination is affirmative, it is determined that the pen has not moved, and the process returns to step S6, and the same processing is repeated. If the result of the determination in step S8 is negative, the process proceeds to step S9 based on the determination that a locus input has been performed instead of locus selection, and the processes after step S9 are performed. According to the above-described process procedure, input distinction means 11 determines how the input coordinates must be processed.

Figure 4:
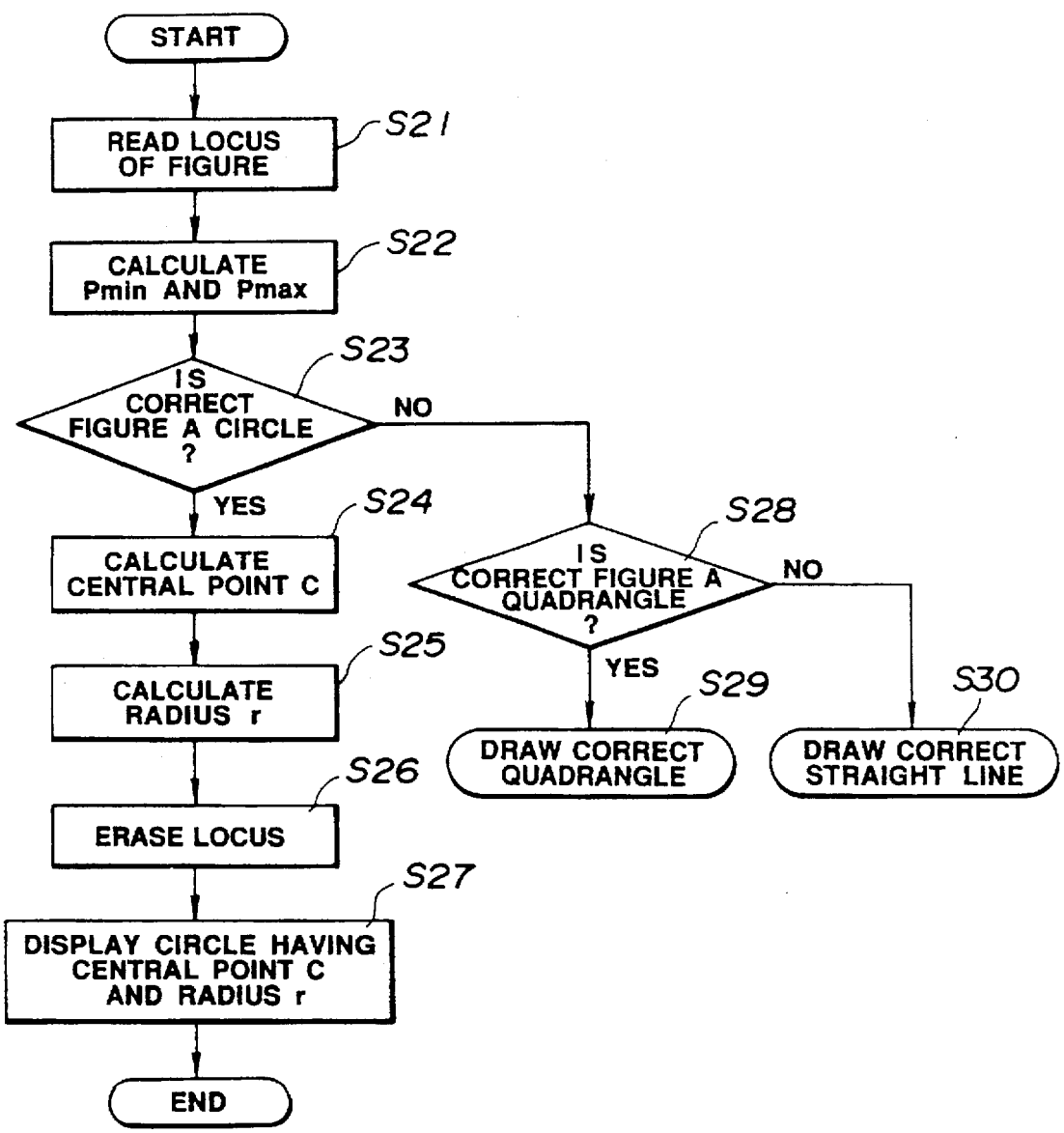
FIG. 4 is a flowchart illustrating the procedure of the operation of the correct figure forming means shown in FIG. 2.

Next, a description will be provided of an example of the procedure of the operation of correct figure forming means 17 of the present invention with reference to the flowchart of FIG. 4.

First, in step S21, the coordinate information of the locus selected by locus selection means 15 and stored in storage device 13 is output. In the next step S22, the maximum X and Y coordinate point is found out from all of read coordinate points as point $P_{max}$. Similarly, point $P_{min}$ is set as the minimum X and Y coordinate point. In step S23, the correct figure to be formed is determined based on the figure established by menu establishing means 16, and the process proceeds to the following steps based on the determination. That is, if the correct figure to be formed has been determined to be a circle, the central point C of the circle is calculated in step S24.

The coordinates of the central point C are obtained by the following expression (1):

$$C_x=(X_{min}+X_{max})/2, \ C_y=(Y_{min}+Y_{max})/2 \quad (1).$$

In the next step S25, the radius r of the circle is calculated by the following expression (2):

$$r=\{(X_{max}-X_{min})+(Y_{max}-Y_{min})\}/4 \quad (2).$$

In step S26, the selected locus which has been displayed is erased. In step S27, the correct circle having the radius r can be drawn around the coordinates of the obtained point C.

If the result of the determination in step S23 is negative, the process proceeds to step S28, in which it is determined whether or not the correct figure to be formed is a quadrangle. If the result of the determination is affirmative, the process proceeds to step S29, in which the coordinate points of the upper left corner and the lower right corner are drawn as points $P_{min}$ and $P_{max}$, respectively. In the case of a straight line, the process proceeds to step S30, in which a greater one of the values $(X_{max}-X_{min})$ and $(Y_{max}-Y_{min})$ is selected, and whether a vertical line or a horizontal line must be drawn is also selected. In the case of a vertical line, the correct line is obtained by connecting the coordinate point $((X_{max}+X_{min})/2, Y_{min})$ to the coordinate point $((X_{max}+X_{min})/2, Y_{max})$. In the case of a horizontal line, the correct line is obtained by connecting the coordinate point $(X_{min}, (Y_{max}+Y_{min})/2)$ to the coordinate point $(X_{max}, ((Y_{max}+Y_{min})/2)$.

Although in the above-described embodiment, a description has been provided of the case of drawing a correct figure by selecting a figure from among three figures, new kinds of figures can be easily added to the correct figure forming means, the figure selection menu and the like.

Figure 5:
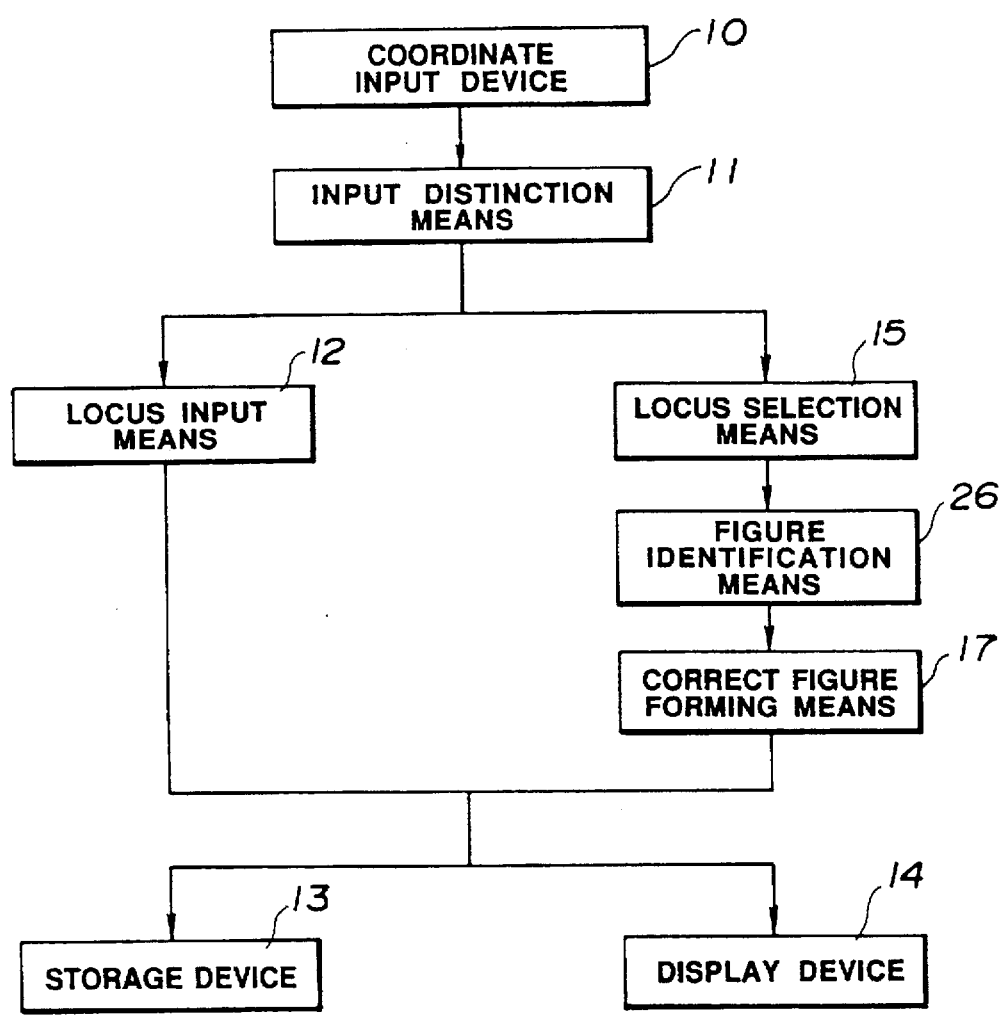
FIG. 5 is a block diagram illustrating the configuration of a second embodiment of the present invention.

In the above-described embodiment, a correct-figure menu is displayed for selecting a figure. In another embodiment of the present invention, however, a correct figure can be formed without using a display. FIG. 5 illustrates the configuration of this embodiment. The configuration of FIG. 5 is substantially the same as the configuration of FIG. 2, expept that figure identification means 26 is provided instead of the menu establishing means. In the present embodiment, after the completion of the processing by locus selection means 15, figure identification means 26 operates so as to identify whether the input figure is a circle, a quadrangle or a straight line by performing symbol identification for the selected locus information using known handwriting on-line processing. The obtained result is the same as the result obtained by menu establishing means 16. A correct figure is obtained in accordance with the result of the identification by operating correct figure forming means 17. According to the above-described configuration, a correct figure intended by the user can be automatically drawn by merely selecting any of input and displayed loci.

While the present invention has been described with respect to what is presently consideredd to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A figure input apparatus comprising:

coordinate input means for inputting coordinate points corresponding to a plurality of loci;

storage means for storing pixel data corresponding to said coordinate points input by said coordinate input means;

display means for displaying the plurality of loci;

selecting means for selecting one of the plurality of loci displayed on the display means;

input means for assigning a type of figure to the selected locus;

correct figure forming means for forming a correct figure by calculating characteristic points corresponding to the stored pixel data of the selected locus and based on the type of assigned figure; and output means for outputting the formed correct figure.

2. An apparatus according to claim 1, further comprising determination means for determining whether coordinates input by said coordinate input means are for forming the locus, or for instructing the formation of the correct figure based on the locus.

3. An apparatus according to claim 1, wherein the formation of the correct figure is instructed by associating the type of figure to the stored locus information.

4. An apparatus according to claim 1, further comprising figure storage means for storing types of figures to be assigned, and for maintaining information relating to the type of figure assigned until another figure is newly assigned.

5. A figure input method comprising the steps of:

inputting coordinate points corresponding to a plurality of loci;

storing pixel data corresponding to said input coordinate points;

displaying said plurality of loci on a display means;

selecting one of the plurality of loci displayed on the display means;

assigning a type of figure to the selected loci;

calculating characteristic points corresponding to the stored pixel data of the selected loci and based on the type of assigned figure;

forming a correct figure based on said calculated characteristic points; and outputting the formed correct figure.

6. A method according to claim 5, further comprising the step of determining whether input coordinates are for forming the locus, or for instructing the formation of the correct figure based on the locus.

7. A method according to claim 5, wherein the formation of the correct figure is instructed by assigning the type of figure by selecting the locus.

8. A method according to claim 5, further comprising the step of storing the type of assigned figure, and maintaining information relating to the type of assigned figure until another figure is newly assigned.

9. A figure input apparatus comprising:

coordinate input means for inputting a locus consisting of a plurality of coordinate points;

storage means for storing locus information which is to be used to display a plurality of loci input by said coordinate input means;

display means for displaying the plurality of loci on the basis of the stored locus information;

locus selection means for selecting one of the plurality of loci displayed on said display means;

input means for assigning a type of figure to the selected locus;

correct figure forming means for reading locus information of the selected locus from said storage means, and for forming a correct figure by calculating characteristic points corresponding to the locus information of the selected locus and based on the type of figure assigned by said input means; and output means for outputting the formed correct figure.

10. An apparatus according to claim 9, further comprising holding means for holding information relating to a status of the type of assigned figure until another figure is newly assigned by the input means.

11. A figure input method comprising the steps of:

inputting a locus consisting of a plurality of coordinate points;

storing locus information which is to be used to display a plurality of input loci;

displaying the plurality of loci on the basis of the stored locus information;

selecting one of the plurality of displayed loci;

inputting information relating to a type of figure assigned to the selected locus; and reading locus information of the selected locus from the stored locus information, and forming a correct figure by calculating characteristic points corresponding to the locus information of the selected locus and based on the type of figure assigned by the input step; and outputting the formed correct image.

12. A method according to claim 11, wherein information relating to the type of figure assigned is held until another figure is newly assigned.

13. A figure input apparatus according to claim 1, wherein said coordinate input means is to input coordinate information input by a tablet.

14. A figure input apparatus according to claim 1, further comprising display means for displaying said formed correct figure.

15. A figure input apparatus comprising:

locus input means for inputting locus information;

storage means for storing locus information input by said locus input means and corresponding to a plurality of loci;

selecting means for selecting a desired locus from the plurality of loci;

figure input means for assigning a type of figure to the desired locus;

correct figure forming means for reading locus information corresponding to the desired locus from said storage means, and for forming a correct figure by calculating characteristic points corresponding to the read locus information and based on the type of figure assigned by the figure input means; and output means for outputting the formed correct figure.

16. A figure input method according to claim 5, wherein said step of inputting is to input coordinate information input by said tablet.

17. A figure input method according to claim 5, further comprising display step for displaying said formed correct figure.

18. A figure input apparatus according to claim 15, wherein the locus input by said selecting means is selected on a display displaying loci stored by said storage means.

19. A figure input apparatus according to claim 9, further comprising display control means for controlling said display means so that the selected locus is displayed.

20. A figure input apparatus according to claim 9, wherein said coordinate input means is to input coordinate information input by a tablet.

21. A figure input apparatus according to claim 9, further comprising display control means for controlling said display means so that said output correct figure is displayed.

22. A figure input method according to claim 11, further comprising display control step for controlling said step of displaying so that the selected locus is displayed.

23. A figure input method according to claim 11, wherein said step of inputting is to input coordinate information input by a tablet.

24. A figure input method according to claim 11, further comprising display control step for controlling said step of displaying so that said formed correct figure is displayed.

25. A figure input apparatus according to claim 15, wherein a type of information input by said selecting means is assigned on a menu screen.

* * * * *

UNITED STATES PATENT AND TRADEMARK OFFICE
CERTIFICATE OF CORRECTION

PATENT NO. : 5,748,779
DATED : May 5, 1998
INVENTOR : Katsuhiko Sakaguchi

It is certified that error appears in the above-identified patent and that said Letters Patent is hereby corrected as shown below:

COVER PAGE

```
Under [56] References Cited, U.S. Patent Documents,
 "Suojima" should read --Shojima--.
```

COLUMN 1

```
Line 25, "conventional-approach," should read
 --conventional approach,--.
```

Signed and Sealed this

Third Day of November, 1998

Attest:

BRUCE LEHMAN

Attesting Officer     Commissioner of Patents and Trademarks